United States Patent [19]

Crawford

[11] Patent Number: 4,487,222

[45] Date of Patent: Dec. 11, 1984

[54] POPPET TYPE FLUID VALVE WITH REPLACEABLE WEAR SURFACE

[75] Inventor: Richard A. Crawford, Gainesville, Tex.

[73] Assignee: Armco, Inc., Middletown, Ohio

[21] Appl. No.: 491,282

[22] Filed: May 3, 1983

[51] Int. Cl.³ .............................................. F16K 15/02
[52] U.S. Cl. ......................... 137/516.29; 137/DIG. 3; 251/363
[58] Field of Search ...................... 137/516.29, 516.27, 137/DIG. 3; 251/360, 363

[56] References Cited

U.S. PATENT DOCUMENTS

| | | | |
|---|---|---|---|
| 1,725,297 | 8/1929 | Patterson | 137/516.29 |
| 1,990,557 | 2/1935 | Melott | 137/DIG. 3 |
| 2,329,576 | 9/1943 | Anderson | 137/516.29 |
| 2,495,880 | 1/1950 | Volpin | 137/516.29 |
| 3,057,372 | 10/1962 | Sutton et al. | 137/516.29 |
| 3,409,039 | 11/1968 | Griffin | 137/516.29 |
| 3,483,885 | 12/1969 | Leathers | 137/516.29 |
| 4,180,097 | 12/1979 | Sjoberg | 137/516.29 |

Primary Examiner—Martin P. Schwadron
Assistant Examiner—John A. Rivell
Attorney, Agent, or Firm—Arnold, White & Durkee

[57] ABSTRACT

A fluid valve suitable for use in slush pumps is disclosed. The valve includes an elastomeric seal and a metal wear ring held in place on a valve body by a retaining ring. Thrust of the valve body against a valve seat is absorbed by the wear ring which is held against a shoulder on the valve body. The elastomeric seal is held between the valve body and the wear ring. A second seal is disposed between the inside diameter of the wear ring and the valve body to prevent fluid leakage behind the wear ring. The structure of the valve provides for replacement of the wear ring.

2 Claims, 3 Drawing Figures

POPPET TYPE FLUID VALVE WITH REPLACEABLE WEAR SURFACE

BACKGROUND OF THE INVENTION

The present invention relates to a valve; more specifically, it relates to a valve suitable for use in high pressure pumps operating in severe service conditions. One example of such a pump is the type of pump used in the drilling completion, and servicing of oil and gas wells. This type of pump may be a slush pump or well service pump. In use, a slush pump is required to operate at high pressure to pump drilling mud. A well service pump will also pump drilling mud, as well as lost circulation materials, cement slurry, acids, polymers, sand slurry, crude oil and fresh or salt water. The valve mechanisms used in slush pumps and well service pumps, therefore, are subjected to severe operating conditions. To prevent leakage of the fluid being pumped, the valve mechanisms in a slush pump require frequent servicing. Because of the harsh conditions in which the valve mechanisms operate, servicing of the valves often involves replacement of the entire valve body.

Clearly, there is a need for an improved valve for use in applications involving high pressure and severe operating conditions.

SUMMARY OF THE INVENTION

The present invention provides an improved valve for use in applications involving high pressure and harsh operating conditions, such as slush pumps. The valve of the present invention provides for replacement of only the wear surface portion of the valve body, rather than the valve body as a whole, when servicing is required.

A fluid valve in accordance with the present invention includes a valve seat having a beveled seating surface circumscribing a bore opening and a valve body having an upper body portion and a lower body portion. The lower valve body portion includes a valve stem and a guide, which are disposed within the valve seat bore upon assembly of the valve. The upper valve body portion comprises a plurality of concentric flanges. First and second concentric flanges of decreasing diameter are inversely stacked to define an outer shoulder disposed above and adjacent an inner shoulder. Third and fourth flanges concentric with one another and with the first and second flanges are separated apart to define a first circumferential groove below and inward of the inner shoulder. A fifth flange adjacent the lower valve body portion and concentric with the fourth flange but spaced apart therefrom defines a second circumferential groove disposed below the first groove. The valve further includes an elastomeric first seal abutting the outer shoulder on the upper valve body portion. The first seal has a beveled surface for engaging an upper portion of the valve seating surface. A wear ring abuts the inner shoulder and nests within the first seal to hold it in place. The wear ring also has a beveled surface extending coplanar with the beveled surface of the first seal, for engaging a lower portion of the valve seating surface. A second seal is disposed within the first circumferential groove to prevent fluid leakage behind the wear ring. A retaining ring disposed within the second circumferential groove engages the wear ring to maintain the wear ring in place.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawing wherein.

DETAILED DESCRIPTION OF A PREFERRED EMBODIMENT

Figure 1:
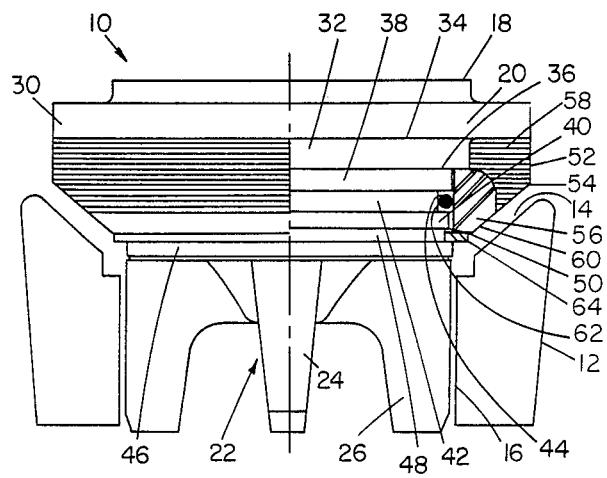
FIG. 1 is a partial section view of a valve in accordance with the present invention.

Referring to the drawing figures, particularly FIG. 1, a valve in accordance with the present invention is shown. The valve includes a valve seat 12 having a beveled seating surface 14 and a bore opening 16. Valve seat 12 is adapted for disposition in the fluid flow path through a pump. For example, the valve of the present invention may be utilized in a Model 12-P-160 triplex slush pump or JWS-400 triplex well service pump available from National Supply Company, Division of Armco Inc., Gainesville, Tex. 76240.

Valve 10 also includes a valve body generally indicated by reference numeral 18. Valve body 18 includes an upper valve body portion 20 and a lower valve body portion 22. The lower valve body portion includes four valve guides 26. The lower valve body portion 22 is adapted for disposition within the valve seat bore opening 16.

Figure 2:
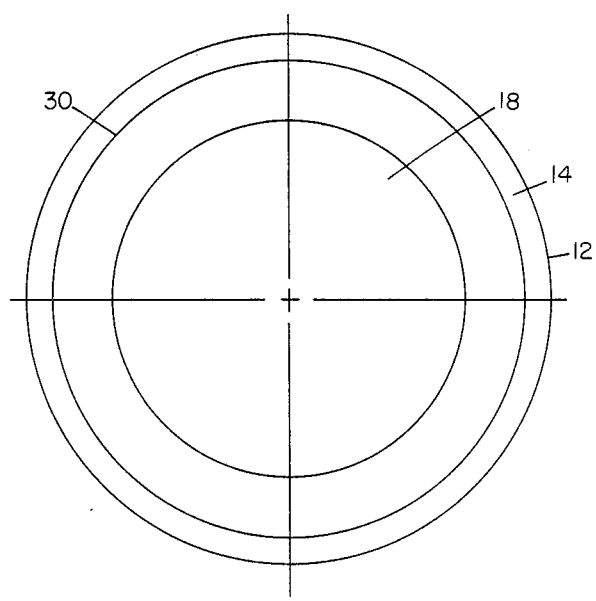
FIG. 2 is a top plan view of the valve shown in FIG. 1.
Figure 3:
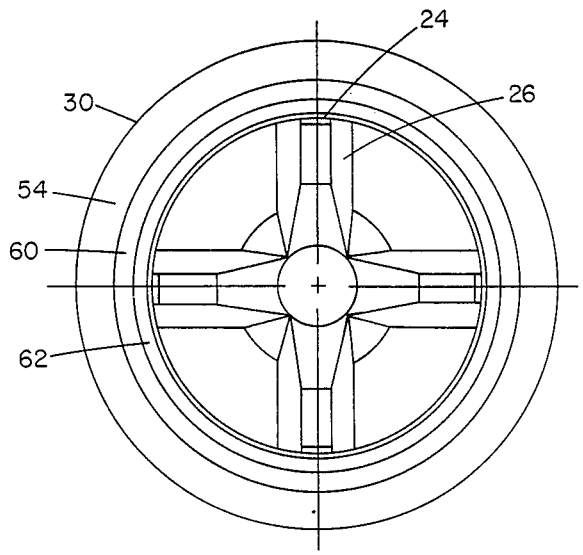
FIG. 3 is a bottom view of the valve shown in FIG. 1.

The upper valve body portion 20 includes a plurality of concentric flanges. First and second concentric flanges 30 and 32 are of decreasing diameter and inversely stacked. This defines an outer shoulder 34 disposed above and adjacent an inner shoulder 36. The concentric relationship of the flanges is best shown in FIG. 2.

Third and fourth concentric flanges 38 and 40 are of approximately equal diameter and spaced apart by a spacer portion 42. This defines a first circumferential groove 14, which is below and inward of inner shoulder 36.

A fifth flange 46 is provided adjacent the lower valve body portion. Flange 46 is concentric with the fourth flange portion and spaced apart therefrom by a spacer body portion 48. The fifth flange is concentric with the fourth flange and of substantially the same diameter. This defines a second circumferential groove 50 disposed below the first groove 44.

An elastomeric seal 52 is disposed around flange 32 and in abuttment with outer shoulder 34. Seal 52 has a beveled surface 54 for engaging an upper portion of the valve seating surface 14. Seal 52 may be made of polyurethane, or other suitable elastomer.

A metal wear ring 56 abuts inner shoulder 36 and extends downwardly therefrom to circumscribe groove 44. Wear ring 56 nests within seal 52 along an interface surface 58. Wear ring 56 also includes a beveled surface 60 which extends approximately parallel to and inset from the beveled surface 54 of seal 52. Beveled surface 60 engages a lower portion of the valve seating surface 14.

A second seal 62 is disposed within first circumferential groove 44. Seal 62 prevents fluid leakage behind wear ring 56.

A retaining ring 64 is disposed within the second circumferential groove 50. Retaining ring 64 engages the underside of wear ring 56 to maintain the wear ring in place.

The foregoing description of the invention has been directed to a particular preferred embodiment for purposes of explanation and illustration. It will be apparent, however, to those skilled in this art that many modifications and changes may be made without departing from the essence of the invention. For example, the wear ring could be held in place by any one of several means, such as a threaded fastener or a shear pin. Further, the wear ring and elastomeric seal may be combined into one component of a suitable material for applications wherein an elastomeric seal or a hardened wear area is not required or wherein a more corrosion or wear resistant material is required. Also, a top guide stem may be added if desired or necessary to have valve guides on top in addition to the bottom valve guides. Finally, although the valve body is shown to be of a one-piece construction, it may consist of two or more pieces which join together. It is the Applicant's intention in the following claims to cover such equivalent modifications and changes as fall within the scope of the invention.

What is claimed is:

1. A fluid valve, comprising:
   (a) a valve seat having a beveled seating surface and a bore opening;
   (b) a valve body having an upper valve body portion and a lower valve body portion;
   (c) said lower valve body portion including a valve guide, to be disposed within the valve seat bore;
   (d) said upper valve body portion including
   (i) first and second concentric flanges of decreasing diameter and inversely stacked, for defining an outer shoulder disposed above and adjacent an inner shoulder;
   (ii) third and fourth flanges concentric with one another and with the first and second flanges, and separated apart, for defining a first circumferential groove below and inward of the inner shoulder;
   (iii) a fifth flange adjacent the lower valve body portion, and concentric with the fourth flange and spaced apart therefrom, for defining a second circumferential groove disposed below the first groove;
   (e) an elastomeric first seal abutting the outer shoulder and having a beveled surface for engaging an upper portion of the valve seating surface;
   (f) a wear ring abutting the inner shoulder and nesting within the first seal to hold it in place, said wear ring having a beveled surface extending substantially parallel to and inset from the beveled surface of the first seal, for engaging a lower portion of the valve seating surface;
   (g) a second seal disposed within the first circumferential groove, for preventing fluid leakage behind the wear ring; and
   (h) a retaining ring disposed within the second circumferential groove, for engaging the wear ring to maintain the wear ring in place.

2. A fluid valve, comprising:
   (a) a valve seat having a beveled seating surface and a bore opening;
   (b) a valve body having an upper valve body portion and a lower valve body portion;
   (c) said lower valve body portion including a valve stem and a guide, to be disposed within the valve seat bore;
   (d) said upper valve body portion including
   (i) a first flange for defining an outer shoulder;
   (ii) second and third flanges concentric with one another and with the first flange, and separated apart from each other, for defining a circumferential groove below and inward of the outer shoulder;
   (e) a replaceable valve seating member abutting the outer shoulder and having a beveled surface for engaging the valve seating surface;
   (f) a seal disposed within the circumferential groove, for preventing fluid leakage behind the valve seating member; and
   (g) means carried on the upper valve body for engaging the valve seating member to maintain it in place.

* * * * *